United States Patent [19]

Masyagutov et al.

[11] Patent Number: 5,109,705
[45] Date of Patent: May 5, 1992

[54] TURBINE RATE-OF-FLOW TRANSDUCER

[76] Inventors: Robert G. Masyagutov, ulitsa Mendeleeva, 203/1, kv. 21, Ufa; Viktor T. Drobakh, ulitsa Paustovskogo, 8, korpus 3, kv. 160, Moscow; Alexandr S. Aprakin, ulitsa Sofii Perovskoi, 13/1, kv. 54, Ufa, all of U.S.S.R.

[21] Appl. No.: 601,822
[22] PCT Filed: Mar. 13, 1989
[86] PCT No.: PCT/SU89/00061
    § 371 Date: Nov. 6, 1990
    § 102(e) Date: Nov. 6, 1990
[87] PCT Pub. No.: WO90/10847
    PCT Pub. Date: Sep. 20, 1990
[51] Int. Cl.⁵ .................................................. G01F 1/12
[52] U.S. Cl. ............................... 73/861.83; 73/861.92
[58] Field of Search ........... 73/861.83, 861.89, 861.91, 73/861.92

[56] References Cited

U.S. PATENT DOCUMENTS

| | | | |
|---|---|---|---|
| 3,238,776 | 3/1966 | Potter | 73/861.91 |
| 3,248,943 | 5/1966 | Francisco, Jr. | 73/861.91 |
| 3,757,578 | 9/1973 | Clinton | |
| 4,242,916 | 1/1981 | Amemori et al. | 73/861.83 |
| 4,790,195 | 12/1988 | Feller | |

FOREIGN PATENT DOCUMENTS

| | | |
|---|---|---|
| 2706745 | 8/1978 | Fed. Rep. of Germany |
| 2526505 | 7/1979 | Fed. Rep. of Germany |
| 3112960 | 10/1982 | Fed. Rep. of Germany |
| 5225748 | 9/1972 | Japan |
| 665210 | 5/1979 | U.S.S.R. |
| 712668 | 1/1980 | U.S.S.R. |
| 1279990 | 6/1972 | United Kingdom |

Primary Examiner—Herbert Goldstein
Attorney, Agent, or Firm—Lilling and Lilling

[57] ABSTRACT

The turbine rate-of-flow transducer incorporates a cylindrical body consecutively located wherein in the cocurrent direction there are a first flow straightener, a device for balancing an axial force of the flow, a rotor and a second flow straightener. The device for balancing the axial force of the flow is a truncated cone with passages spaced equidistantly apart all the way along the circumference of the side surface. Each passage is directed so that a projection of its longitudinal axis makes with a plane through an axis of revolution of the rotor an angle between 7° and 20°, the vertex whereof points towards the vertex of an angle inclined whereat are the vanes of the rotor. The aggregate cross-sectional area of the passages in the zone of the large base of the means of balancing amounts to 2-6% of the area of flow section at the inlet into the rotor. A pickup located in the body in the zone of the rotor generates a pulse each time a vane of the rotor passes.

2 Claims, 1 Drawing Sheet

5,109,705

TURBINE RATE-OF-FLOW TRANSDUCER

FIELD OF THE INVENTION

The present invention relates to mechanical engineering and has specific reference to a turbine rate-of-flow transducer.

DESCRIPTION OF THE PRIOR ART

Widely known is a turbine rate-of-flow transducer (JP; a: 52-25,748) in a cylindrical body whereof there are consecutively located in the cocurrent direction a first flow straightener, a means of balancing an axial force of the flow, a rotor and a second flow straightener. Each of the flow straighteners is a fairing which faces the oncoming flow stream in a coaxial position relative to the body and is fitted with radial fins secured to the body. The means of balancing the axial force is a truncated cone, the small base whereof interacts with an end face of the first fairing. In the side surface of the means of balancing the axial force, there are provided passages which are spaced equidistantly apart all the way along the circumference and extend parallel to the generatices. The rotor is fitted with provision for revolving in the body in a coaxial position therewith. A pickup generating a pulse each time a vane tip passes is fitted to the body in the zone of the motor.

The prior art transducer is adapted to measure the flow rate of fluids with a variable viscosity. However, the rectilinear passages provided in the means of balancing the axial force are a disadvantage, for they fail to form a fully-developed velocity profile and set up an adequate turbulence which would give rise to a transition Reynolds number causing the rotor to operate under the conditions of self-similarity when a linearization of the static characteristic of the transducer takes place and the effect of a changeable viscosity is at a minimum. Poor accuracy and a short range of measurements are therefore unavoidable.

SUMMARY OF THE INVENTION

The principal object of the invention is to provide a turbine rate-of-flow transducer wherein features of the design of the means of balancing the axial force of the flow would ensure a comparatively high accuracy of measurements under conditions of a flow rate and viscosity varying over a wide range.

This object is realized by a turbine rate-of-flow transducer incorporating a cylindrical body consecutively located wherein in the cocurrent direction there are a first flow straightener, which is a fairing facing the oncoming flow stream in a coaxial position relative to the body and having radial fins attached to the body; a means of balancing the axial force of the flow, which is a truncated cone the small base whereof interacts with an end face of the fairing and in the side surface whereof there are made passages spaced equidistantly apart all the way along the circumference; a rotor fitted with provision for revolving in the body in a coaxial position therewith; a second flow straightener, which is located symmetrically relative to an axis extending at right angles to an axis of revolution of the rotor and is identical with the first flow straightener: and, a pickup which is fitted to the body in the zone of the rotor and generates a pulse each time a vane tip passes. According to the invention every passage in the means of balancing the axial force of the flow is directed so that a projection of a longitudinal axis thereof on a plane through the axis of revolution of the rotor makes with this axis an angle between 7° and 20°, the vertex whereof being pointed towards the vertex of an angle inclined whereat are the rotor vanes, and the aggregate cross-sectional area of the passages in the zone of the large base of the means of balancing is between 2% and 6% of the area of flow section at the inlet into the rotor.

To minimize the drag of the rotor vanes, ensure an impactless entry of the mainstream into the rotor and reduce the moment of the forces of viscous friction at the inlet into the rotor, it is expedient that the leading edge of each rotor vane is formed by two planes making with each other an angle between $2/3(90°-\gamma)$ and $(90°-\gamma)$, where $\gamma$ is the angle which the vanes of the rotor make with the axis of revolution of the rotor.

BRIEF DESCRIPTION OF THE DRAWINGS

A preferred embodiment of the invention will now be described by way of example with reference to the accompanying drawings, wherein.

PREFERRED EMBODIMENT OF THE INVENTION

Figure 1:
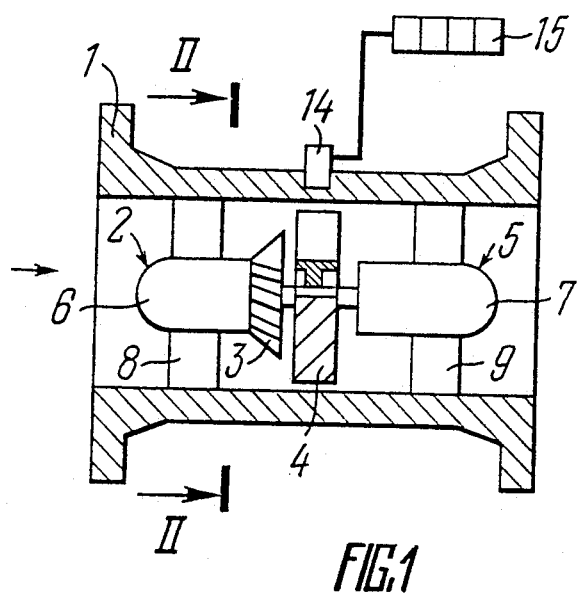
FIG. 1 is a sectional view of the turbine rate-of-flow transducer according to the invention.
Figure 2:
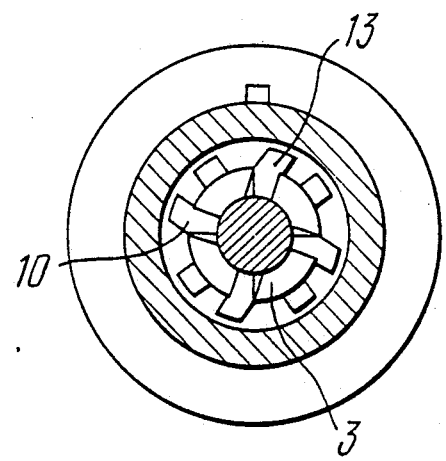
FIG. 2 is a cross sectional view taken on line II—II of FIG. 1.
Figure 3:
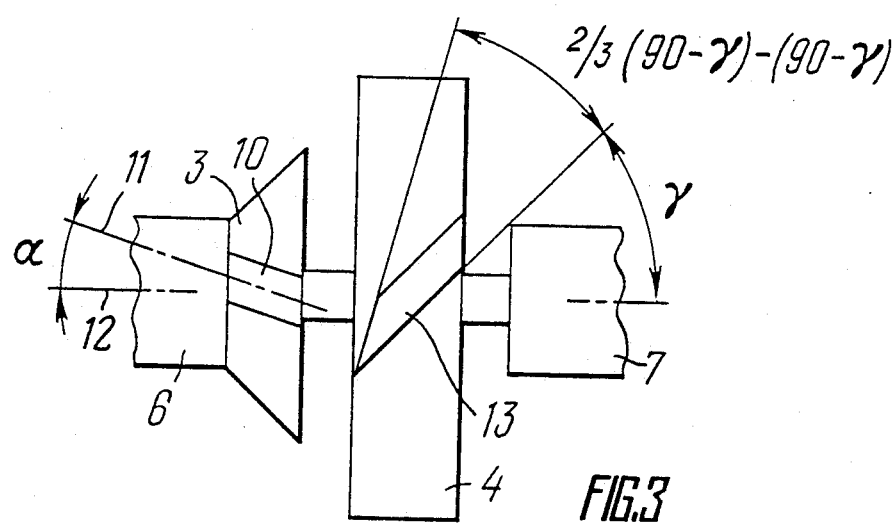
FIG. 3 illustrates the layout of the passages in the means of balancing the axial force of the flow stream.

The disclosed turbine rate-of-flow transducer incorporates a cylindrical body 1 (FIG. 1) consecutively located wherein the cocurrent direction there are a first flow straightener 2, a means 3 of balancing the axial force of the flow, a rotor 4 and a second flow straightener 5. Each of the flow straighteners 2, 5 is a fairing 6, 7 which is located in a coaxial position relative to the body 1 and is provided with radial fins 8, 9, respectively, secured to the body 1. The fairings 6, 7 are located symmetrically with respect to an axis extending at right angles to the axis of revolution of the rotor 4. The rotor 4 is fitted to a spindle 4a secured to the fairings 6, 7 at its ends. The means 3 of balancing the axial force is a truncated cone the small base whereof interacts with an end face of the fairing 6. Passages 10 (FIG. 2) are provided in the means 3 of balancing the axial force and are spaced equidistantly apart all the way along the circumference and orientated so that a projection 11 (FIG. 3) of a longitudinal axis of each passage 10 makes with a plane through the axis 12 of revolution of the rotor 4 an angle $\alpha$ which is between 7° and 20°, whereby the vertex of this angle points towards the vertex of an angle $\gamma$ inclined whereat are vanes 13 of the rotor 4. An angle $\gamma$ which is less than 7° or greater than 20° increases or reduces, respectively, the effect of a variable flow rate and viscosity on the linearity of the turbine transducer characteristic under the conditions of a low flow rate. This impairs the accuracy of measurements.

The aggregate cross-sectional area of the passages 10 in the zone of the large base of the means 3 of balancing amounts to 2-6% of the area of flow section at the inlet into the rotor 3. A failure to meet this requirement leads to an interference with an optimum redistribution of flow velocities upstream and downstream of the rotor 4 so that its hydrodynamic equilibrium becomes upset by the velocity head. Consequently, the rotor 4 is pressed against the fairing 7 if the aggregate cross-sectional area of the passages 10 is less than 2% of the area of flow section at the inlet into the rotor 4. Alternatively, the rotor 4 becomes pressed against the fairing 6 if the above proportion is over 6%. In either case, the linearity of characteristics and the accuracy of measurements are impaired.

A leading edge of each vane 13 of the rotor 3 is shaped by two planes making an angle between $2/3(90°-\gamma)$ and $(90°-\gamma)$ with each other. This minimizes the drag of the vanes 13, provides for an impactless entry of the mainstream into the rotor 4 and reduces the moment of the forces of viscous friction at the rotor inlet. Owing to that, the linearity of characteristic is improved and the deviation of the conversion coefficient $K=\omega/Q$, where $\omega$ is angular velocity and Q is flow rate, which is brought about by a variable viscosity under the conditions of low flow rate, is minimized. This has a positive effect on the accuracy and measurement range.

If the angle between the two planes forming the leading edge of each vane 13 is greater than $(90°-\gamma)$, an extra component of translational velocity comes into play under the conditions of low flow rate which retards the rotary motion of the rotor 4. This also impairs the linearity of characteristic and the accuracy of measurements by the turbine rate-of-flow transducer. An angle between the two planes which is less than $2/3(90°-\gamma)$ is impractical, for no marked improvement in the linearity of characteristic takes place in this case.

A pickup 14 (FIG. 1) connected to a counter 15 is fitted inside the body 1 in the zone of the rotor 4.

In operation, a flow stream entering the cylindrical body 1 acts upon the vanes 13 of the rotor 4 on passing over the first flow straightener 2 and through the passages 10 (FIG. 3) of the means 3 of balancing the axial force. The rotor 4 is set into rotary motion with an angular velocity changing directly with the flow rate.

Jets of the flow stream, which pass through the slanting passages 10 in the side surface of the means 3 of balancing the axial force, acquire rotary motion with the result that a pulsating velocity is set up and the turbulence of the flow stream increases. The point of transition of the laminar boundary layer into a turbulent one is shifted, the thickness of the boundary layer decreases and a widening of the area of the vanes 13 of the rotor 4 covered by the turbulent boundary layer takes place. As a result, the transition Reynolds number decreases and the conditions of self-similarity—which bring about linearization of the static characteristic of the transducer and reduce the effect of variable viscosity on the accuracy and range of measurements—extend over a wider area of the rotor 4.

The pickup 14 (FIG. 1) generates pulses when the vanes 13 of the rotor 4 pass one after another, and the pulses are transmitted to the counter 15.

The turbine rate-of-flow transducer disclosed in accordance with the invention provides for a higher accuracy of measurements compared with the prior art transducers. It is more reliable in operation, for the rotor is relieved of the hydrodynamic load. The disclosed turbine transducer also poses no problems in manufacture, servicing and repair.

INDUSTRIAL APPLICABILITY

The present invention may be of utility as a means of measuring the flow rates of fluids with a variable viscosity in the oil, petrochemical, chemical and other industries.

We claim:

1. A turbine rate-of-flow transducer comprising a cylindrical body in which there are consecutively located in a cocurrent direction a first flow straightener including a fairing facing an oncoming flow stream in a coaxial position relative to said cylindrical body and having radial fins attached to said body; a means of balancing an axial force of said flow stream including a truncated cone, the small base of said truncated cone interacting with an end face of said fairing of said first flow straightener, and passages being made in a side surface of said truncated cone and being spaced equidistantly apart all the way along the circumference of said truncated cone; a rotor having vanes and fitted for revolving in said cylindrical body and in a coaxial position with said cylindrical body; a second flow straightener including a fairing located in a coaxial position relative too said body and having radial fins attached to said body, said fairings of said first and second straightener being located symmetrically with respect to an axis extending at right angles to an axis of revolution of said rotor, each of said passages of said truncated cone being directed so that a projection of a longitudinal axis of each said passages makes with a plane of an axis of revolution of said rotor an angle between 7° and 20° and a vertex of said angle being pointed towards a vertex of an angle at which said vanes of said rotor are inclined, and an aggregate cross sectional area of said passages of said truncated cone in the area of a large base of said truncating cone being between 2 and 6% of the area of flow section at an inlet into said rotor; and a pickup fitted to said cylindrical body in the zone of said rotor and generating a pulse each time a vanes of said rotor passes.

2. A turbine rate-of-flow transducer as in claim 1, wherein the leading edge of each vane of the rotor is formed by two planes making with each other an angle between $2/3 (90°-\gamma)$ and $(90°-\gamma)$, where $\gamma$ is the angle which the rotor vanes make with the axis of revolution of the rotor.

* * * * *